(12) United States Patent
Watanabe et al.

(10) Patent No.: US 12,487,087 B2
(45) Date of Patent: Dec. 2, 2025

(54) GYROCOMPASS

(71) Applicant: TOKYO KEIKI INC., Tokyo (JP)

(72) Inventors: Takuya Watanabe, Tokyo (JP); Takashi Koyama, Tokyo (JP); Shota Nishiizumi, Tokyo (JP)

(73) Assignee: Tokyo Keiki Inc., Tokyo (JP)

( * ) Notice: Subject to any disclaimer, the term of this patent is extended or adjusted under 35 U.S.C. 154(b) by 379 days.

(21) Appl. No.: 18/121,059

(22) Filed: Mar. 14, 2023

(65) Prior Publication Data

US 2023/0400304 A1    Dec. 14, 2023

(30) Foreign Application Priority Data

Jun. 9, 2022   (JP) ................................. 2022-093869

(51) Int. Cl.
  *G01C 19/38*    (2006.01)
  *G01C 19/20*    (2006.01)

(52) U.S. Cl.
  CPC .............. *G01C 19/38* (2013.01); *G01C 19/20* (2013.01)

(58) Field of Classification Search
  CPC .................................... G01C 9/20; G01C 9/38
  USPC .......................................................... 33/324
  See application file for complete search history.

(56) References Cited

U.S. PATENT DOCUMENTS

| | | | |
|---|---|---|---|
| 3,855,711 A * | 12/1974 | Kawada | G01C 19/38 33/327 |
| 3,935,644 A * | 2/1976 | Kawada | G01C 19/38 33/324 |
| 4,055,901 A * | 11/1977 | Ishii | G01C 19/38 33/324 |
| 4,451,990 A | 6/1984 | Hojo | |
| 4,472,978 A * | 9/1984 | Levine | G01C 19/38 74/5.34 |
| 4,603,483 A * | 8/1986 | Wing | G01C 19/14 33/327 |
| 4,621,266 A * | 11/1986 | Le Gall | H01Q 1/18 342/359 |

(Continued)

FOREIGN PATENT DOCUMENTS

| | | |
|---|---|---|
| JP | 0885730 A | 3/1977 |
| JP | 3467633 B2 | 11/2003 |
| JP | 2019100706 A | 6/2019 |

OTHER PUBLICATIONS

Extended European Search Report for corresponding European patent application 23162895.9, dated Nov. 2, 2023, 7 pages.

*Primary Examiner* — George B Bennett
(74) *Attorney, Agent, or Firm* — Cooper Legal Group LLC

(57) ABSTRACT

A gyrocompass includes: a binnacle; a gyro case having a gyro rotor; a vertical ring mounted on the binnacle for rotation about a vertical axis, the vertical axis extending perpendicular to a gimbal axis and a horizontal axis, the gimbal axis extends in a direction of a spin axis of the gyro rotor and the horizontal axis extends perpendicular to the gimbal axis and parallel to a horizontal plane; a horizontal ring supported by the vertical ring for rotation about the gimbal axis and supporting the gyro case for rotation about the horizontal axis or supported by the vertical ring for rotation about the horizontal axis and supporting the gyro case for rotation about the gimbal axis; a horizontal servo motor for rotating the gyro case about the horizontal axis; and an azimuth servo motor mounted on the vertical ring for rotating the vertical ring about the vertical axis.

8 Claims, 9 Drawing Sheets

(56) References Cited

U.S. PATENT DOCUMENTS

| | | | | |
|---|---|---|---|---|
| 4,686,771 A | * | 8/1987 | Beveventano | G01C 19/38 |
| | | | | 33/324 |
| 4,708,024 A | | 11/1987 | Hojo et al. | |
| 6,131,297 A | | 10/2000 | Yamamoto et al. | |
| 7,114,263 B2 | * | 10/2006 | Toda | G01C 19/38 |
| | | | | 33/327 |
| 8,099,876 B1 | * | 1/2012 | Truncale | G01C 19/38 |
| | | | | 33/324 |
| 8,528,220 B2 | * | 9/2013 | Magosaki | G01C 19/38 |
| | | | | 33/324 |
| 8,661,898 B2 | * | 3/2014 | Watson | G01C 19/5691 |
| | | | | 73/504.18 |
| 2005/0193578 A1 | * | 9/2005 | Toda | G01C 19/38 |
| | | | | 33/327 |
| 2007/0282528 A1 | * | 12/2007 | Morgan | G01C 21/165 |
| | | | | 701/510 |
| 2010/0089158 A1 | * | 4/2010 | Watson | G01C 19/5691 |
| | | | | 73/504.12 |

* cited by examiner

GYROCOMPASS

CROSS-REFERENCE TO RELATED APPLICATIONS

The present application claims priority to Japanese Patent Application No. 2022-093869, filed on Jun. 9, 2022, which is incorporated herein by reference.

TECHNICAL FIELD

The present invention relates to a gyrocompass.

BACKGROUND OF THE INVENTION

Gyrocompasses have been widely used as a measure for acquiring azimuth information with precision. Gyrocompasses utilize the nature of a spinning gyro rotor, which tends to maintain the orientation of its spin axis in space. Thus, gyrocompasses have a spinning gyro rotor and makes the gyro rotor have a tendency to maintain the orientation of its axis in the north-south direction, i.e., makes one end of the spin axis of the gyro rotor always point towards the north. This is referred to as the north-seeking effect of the gyrocompass.

When in use, gyrocompasses are mounted on a rocking-prone vehicle such as a boat or ship, so that they need to have not only static precision but also dynamic precision. The static precision highly depends on the ratio between the magnitude of angular momentum of the gyro rotor housed in the gyro case and the magnitude of any harmful torque acting on the gyro case which may be caused, for example, by frictional force acting on the gyro case. For this reason, there have been proposed techniques for achieving a high static precision with a relatively small angular momentum of the gyro rotor. For example, according to one known technique, a gyrocompass has a gyro case, which is suspended not by any ball bearings but by a low-friction suspension mechanism, from which only so small frictional forces may act on the gyro case. Also, according to another known technique, a gyrocompass has a gyro case, whose displacement is detected by a contactless detector.

There is a known example of a gyrocompass using both of the above techniques, which includes: a gyro case having a gyro rotor contained therein; a tank confining therein the gyro case together with an amount of a liquid; a first support mechanism including a suspension wire connecting the gyro-case and the tank with each other so as to suspend the former within the latter; a second support mechanism for supporting the tank with three degrees of rotational freedom; and a vertical follow-up mechanism for rotating the tank about a gravity line so as to cause the tank to follow-up the rotational displacement of the gyro case with respect to the rotation about the gravity line (see Patent Document No. 1 listed below). The three degrees of rotational freedom of the second support mechanism is the freedom with respect to the rotations about: a gimbal axis extending in the direction of the spin axis of the gyro rotor; a vertical axis extending in the vertical direction and perpendicular to the gimbal axis; and a horizontal axis extending in the east-west direction and perpendicular to both the spin axis and the vertical axis.

Further, there have been gyrocompasses having an azimuth follow-up system and a horizontal follow-up system for causing the tank to follow-up the gyro case with respect to the rotations about the vertical axis and the horizontal axis, respectively, in which displacements of the gyro case are detected by the two follow-up systems, and the detected displacements of the gyro case are used to derive azimuth signals by processing, which are outputted from the gyrocompasses for use by other devices. Such gyrocompasses have a rotary part and a stationary part, the former being supported by the latter for rotational movements about the vertical and horizontal axes. Such gyrocompasses further have a rotary connecter, such as a slip ring system and a rotary transformer, which is used for (i) supplying electric power from the stationary part to the rotary part and (ii) providing communication between the stationary and rotary parts in order to control the follow-up operations as well as to derive the azimuth signals. The stationary part includes a binnacle, while the rotary part includes a vertical ring supported by the binnacle for rotation about the vertical axis and a horizontal ring supported by the vertical ring for rotation about a horizontal axis.

There is a known example of a gyrocompass having the above structure, which has a rotary transformer providing (i) an electric power supplying channel, (ii) a first signal channel for communicating signals relating to an azimuth follow-up system, and (iii) a second signal channel for communicating signals relating to a horizontal follow-up system (see Patent Document No. 2 listed below).

PRIOR ART DOCUMENTS

Patent Documents

Patent Document No. 1: Japanese Patent Publication No. 0885730

Patent Document No. 2: Japanese Patent Publication No. 3467633

SUMMARY OF THE INVENTION

Problem to be Solved by the Invention

There has been used a gyrocompass, including: a rotary part and a stationary part, in which the rotary part includes a vertical ring supported by the stationary part for rotation about a vertical axis; an azimuth servo motor mounted on the stationary part, which is controlled on the basis of azimuth follow-up signal so as to rotate the vertical ring about the vertical axis in an attempt to keep azimuth error as little as possible; and a rotary connector, which may include a slip ring system or a rotary transformer, for transferring the azimuth follow-up signal from the rotary part to the azimuth servo motor, wherein the azimuth servo motor is mounted on the stationary part. In general, however, slip ring systems are subject to contact failure due to, for example, mechanical wearing, while rotary transformers are subject to signal delay and/or signal errors due to their contactless communication. Therefore, the use of a rotary connector in controlling the azimuth servo motor has a problem of poor azimuth precision caused by azimuth errors.

The embodiments of the present invention has been achieved in order to solve the above problem. Accordingly, it is an object of the embodiments to provide a gyrocompass having an improved azimuth precision.

Solution

In order to achieve the above object, a gyrocompass according to the present invention comprises: a binnacle adapted to be fixedly mounted on a navigation vehicle; a gyro case having a gyro rotor contained therein; a vertical ring mounted on the binnacle for rotation about a vertical axis, the vertical axis extending perpendicular to a gimbal axis and to a horizontal axis, wherein the gimbal axis extends in the direction of a spin axis of the gyro rotor and the horizontal axis extends perpendicular to the gimbal axis and parallel to a horizontal plane; a horizontal ring which is either (i) supported by the vertical ring for rotation about the gimbal axis and supporting the gyro case for rotation about the horizontal axis or (ii) supported by the vertical ring for rotation about the horizontal axis and supporting the gyro case for rotation about the gimbal axis; a horizontal-axis-rotation torquer for rotating the gyro case about the horizontal axis; and a vertical-axis-rotation torquer mounted on the vertical ring for rotating the vertical ring about the vertical axis.

Advantages Provided by the Invention

According to the embodiments, there is provided a gyrocompass having an improved azimuth precision.

EXEMPLARY MODE FOR CARRYING OUT THE INVENTION

With reference to the accompanying drawings, several embodiments of the present invention are described in detail.

First Embodiment (Structure of Gyrocompass)

Figure 1:
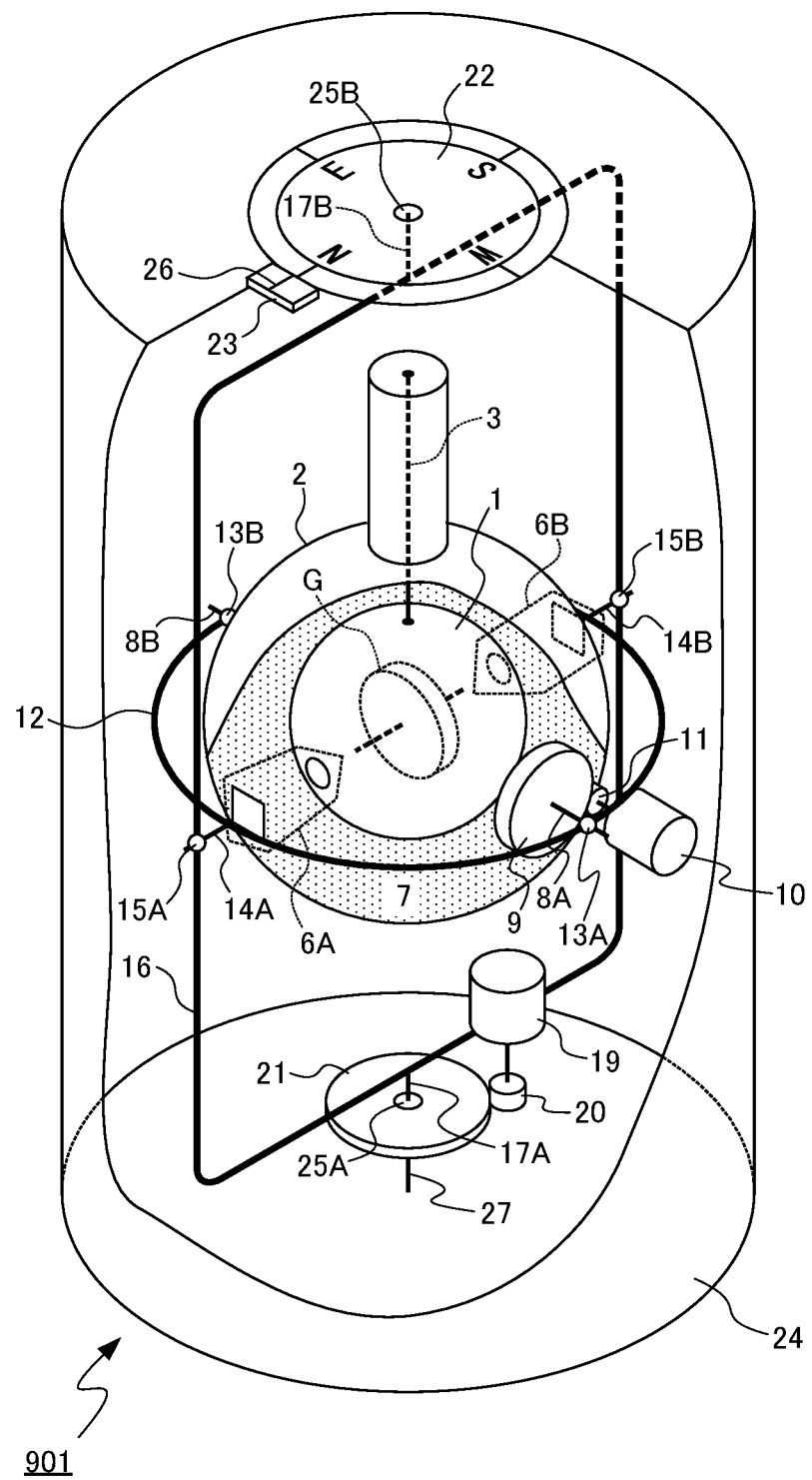
FIG. 1 is a schematic perspective view of a gyrocompass according to a first embodiment of the present invention.

To begin with, described is a structure of a gyrocompass according to a first embodiment of the present invention. FIG. 1 is a schematic perspective view of the gyrocompass of this embodiment. FIG. 1 shows elements of the gyrocompass, among which a tank and a binnacle are shown partially cut out for clear illustration. When in use, the gyrocompass of this embodiment is mounted on a navigation vehicle, such as a ship.

As shown in FIG. 1, the gyrocompass 901 of this embodiment has a gyro case 1, a tank 2, a horizontal ring 12, a vertical ring 16, a binnacle 24 and a gyrocompass control system (not shown in FIG. 1) for controlling the operation of the gyrocompass. The binnacle 24 is generally cylindrical in shape and has a hollow inner space within which the gyro case 1, the tank 2, the horizontal ring 12 and the vertical ring 16 are housed. The horizontal ring 12 is a ring surrounding the tank 2 while extending in a horizontal plane. The vertical ring 16 is a ring surrounding the tank 2 while extending in a vertical plane.

The gyro case 1 is generally spherical in shape and has a hollow inner space within which a gyro rotor G is housed. The gyro case 1 is a liquid-tight case. The tank 2 is a container for containing therein the gyro case 1, which is suspended by a suspension wire 3 and supported thereby within the tank 2. The suspension wire 3 has its upper and lower ends connected to the tank 2 and the gyro case 1, respectively. The inner space of the tank 2 is filled up with a highly viscous liquid 7 such as a damping oil. When the gyrocompass is in use, the gyro rotor G is spinning about an axis (referred to as the spin axis), and the spin axis tends to be oriented in the north-south direction due to spinning. The gyrocompass further has a pair of displacement detector units 6A and 6B which are implemented between the gyro case 1 and the tank 2 in order to detect positional and directional displacements of the gyro case 1 relative to the tank 2 through a contactless detection technique.

The tank 2 has a pair of horizontal shafts 8A and 8B connected onto the outer surface of the tank 2. The horizontal shafts 8A and 8B are located at two respective locations on the equator of the tank 2 and on the opposite sides of the tank 2. The horizontal shafts 8A and 8B define an axis (referred to as the horizontal axis), which intersects perpendicular to the spin axis of the gyro rotor G and tends to be oriented in the east-west direction when the gyrocompass is in use. Thus, the horizontal axis tends to be oriented in the direction which is perpendicular to the spin axis and to the vertical direction. The horizontal shafts 8A and 8B are supported for rotation by two respective horizontal shaft bearings 13A and 13B, which are mounted onto the horizontal ring 12 at two respective opposite locations on the ring 12. The gyrocompass has a horizontal servo motor 10 mounted onto the horizontal ring 12 and having a horizontal pinion 11 attached to its output shaft. The gyrocompass has a horizontal gear 9 meshing with the horizontal pinion 11, which is mounted onto one of the horizontal shafts, indicated by 8A.

The gyrocompass 901 has a pair of gimbal shafts 14A and 14B fixedly connected onto the horizontal ring 12 at two respective opposite locations on the ring 12. The gimbal shafts 14A and 14B define a gimbal axis, which intersects perpendicular to the horizontal axis defined by the horizontal shafts 8A and 8B. The gimbal axis is oriented to extend in the same direction as the spin axis when the gyrocompass is in use. The gimbal shafts 14A and 14B are supported for rotation by two respective gimbal shaft bearings 15A and 15B, which are mounted onto the vertical ring 16 at two respective opposite locations on the ring 16.

The gyrocompass 901 has a pair of vertical shafts 17A and 17B mounted onto the vertical ring 16 at two respective opposite locations on the ring 16. The vertical shafts 17A and 17B define an axis (referred to as the vertical axis), which intersects perpendicular to the gimbal axis defined by the gimbal shafts 14A and 14B. The vertical axis is oriented in the vertical direction when the gyrocompass is in use. The vertical shafts 17A and 17B are supported for rotation by two respective vertical shaft bearings 25A and 25B, which are provided at two respective locations separated from each other in the vertical direction. Specifically, one of the vertical shaft bearings, indicated by 25B, is mounted onto the ceiling of the binnacle 24. The other of the vertical shaft bearings, indicated by 25A, may be mounted on the upper side of an azimuth gear 21 as shown in FIG. 1. Alternatively, the vertical shaft bearing 25A may be mounted on a base plate 27 fixed on the bottom of the binnacle 24.

The gyrocompass 901 has an azimuth servo motor 19 mounted onto the vertical ring 16. The azimuth servo motor 19 drives an azimuth pinion 20 attached to its output shaft. The gyrocompass has an azimuth gear 21 mounted onto the base plate 27 and meshing with the azimuth pinion 20.

The gyrocompass 901 has a compass card 22 fixedly connected to the upper vertical shaft 17B and exposed above the upper surface of the binnacle 24. The compass card 22 rotates together with the upper vertical shaft 17B and thus relative to the binnacle 24. Further, the gyrocompass 901 has a lubber line plate 23 with a lubber line 26 marked thereon. The lubber line 26 and the compass card 22 cooperate to indicate the heading azimuth of the ship on which the gyrocompass 901 is mounted. When the gyrocompass 901 is installed in a ship, it is mounted onto the ship such that the lubber line 26 indicates the heading direction of the ship.

By virtue of the structure of the gyrocompass 901 described above, the tank 2 is supported with three degrees of rotational freedom, allowing rotations of the tank 2 about: the horizontal axis defined by the horizontal shafts 8A and 8B; the gimbal axis defined by the gimbal shafts 14A and 14B; and the vertical axis defined by the vertical shafts 17A and 17B. Further, the gyrocompass 901 has an azimuth follow-up system, which is composed of a part of the pair of displacement detector units 6A and 6B and the azimuth servo motor 19, and in which the azimuth servo motor 19 is operated so as to maintain the relative rotational position between the gyro case 1 and the tank 2 with respect to the rotation about the vertical axis defined by the vertical shafts 17A and 17B, as described later in more detail. Also, the gyrocompass has a horizontal follow-up system, which is composed of another part of the pair of displacement detector units 6A and 6B and the horizontal servo motor 10, and in which the horizontal servo motor 10 is operated so as to maintain the relative rotational position between the gyro case 1 and the tank 2 with respect to the rotation about the horizontal axis defined by the horizontal shafts 17A and 17B, again as described later in more detail.

(Structure of Displacement Detector Unit)

Figure 2:
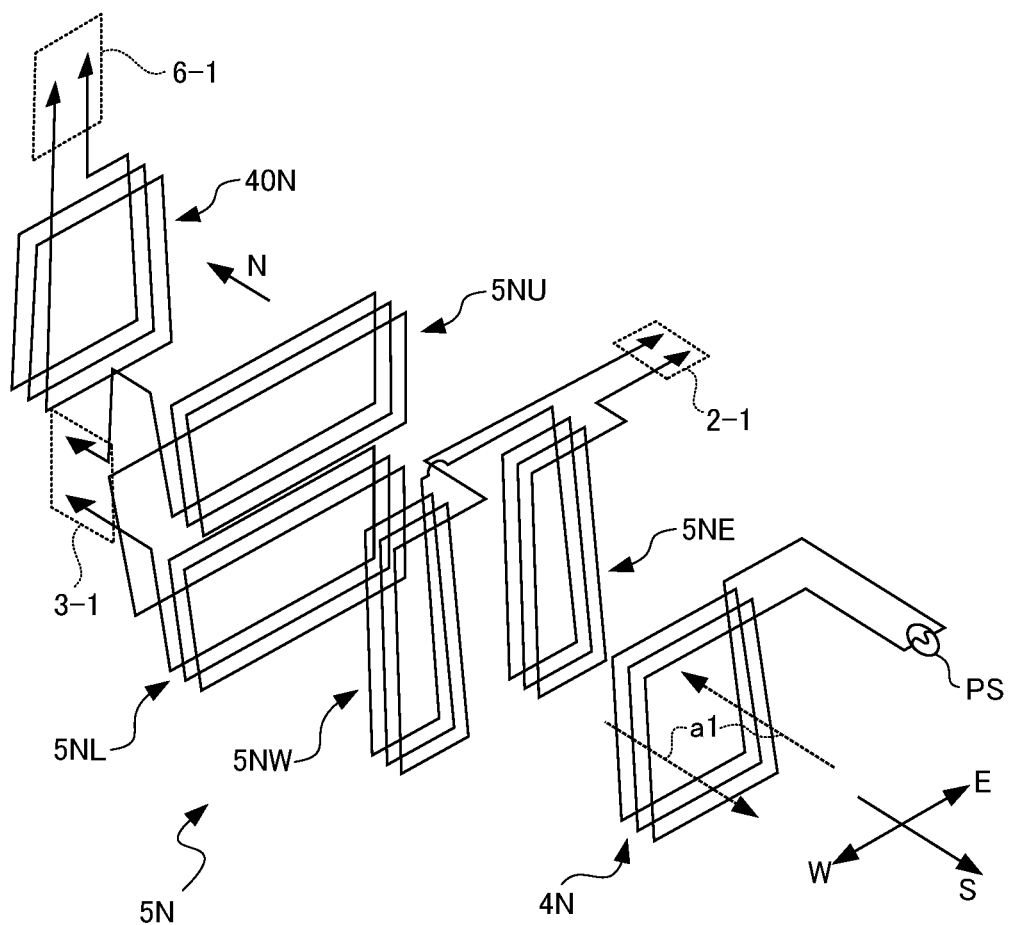
FIG. 2 is a schematic diagram showing a structure of a displacement detector unit.

Next described are a structure and operation of the displacement detector units 6A and 6B. FIG. 2 is a schematic diagram showing the structure of the displacement detector unit. The two displacement detector units 6A and 6B have the same structure, so that only one of the displacement detector units, the north-side displacement detector unit 6A, is shown in FIG. 2.

As shown in FIG. 2, the displacement detector unit 6A includes a primary coil 4N, a secondary coil 5N and a damping action control coil 40N. The primary coil 4N is attached onto the outside surface of the gyro case 1 at the location which is on the spin axis of the gyro rotor and to the north of the gyro rotor when the gyrocompass is in use. The secondary coil 5N is attached onto the inside surface of the tank 2 at the location which faces to the location of the primary coil 4N. The damping action control coil 40N is attached onto the inside surface of the tank 2, as with the secondary coil 5N. Similarly, the south-side displacement detector unit 6B includes a primary coil 4S, a secondary coil 5S and a damping action control coil 40S. The primary coil 4S is attached onto the outside surface of the gyro case 1 at the location which is on the spin axis of the gyro rotor and to the south of the gyro rotor when the gyrocompass is in use. The secondary coil 5S is attached onto the inside surface of the tank 2 at the location which faces to the location of the primary coil 4S. The damping action control coil 40S is attached onto the inside surface of the tank 2, as with the secondary coil 5S.

The secondary coil 5N includes four rectangular coil segments 5NW, 5NE, 5NU and 5NL. The same way, the secondary coil 5S includes four rectangular coil segments 5SW, 5SE, 5SU and 5SL. The rectangular coil segments 5NW and 5NE are located side-by-side in the east-west direction, while the rectangular coil segments 5NU and 5NL are located side-by-side in the vertical direction. The same way, the rectangular coil segments 5SW and 5SE are located side-by-side in the east-west direction, while the rectangular coil segments 5SU and 5SL are located side-by-side in the vertical direction. Further, the rectangular coil segments 5NW and 5NE are differentially connected, while the rectangular coil segments 5NU and 5NL are differentially connected. The same way, the rectangular coil segments 5SW and 5SE are differentially connected, while the rectangular coil segments 5SU and 5SL are differentially connected.

The displacement detector units 6A and 6B are used to detect relative displacement of the tank 2 relative to the gyro case 1. The detection of the relative displacement is described in the following, especially with respect to the north-side displacement detector unit 6N. As shown in FIG. 2, the windings of the primary coil 4N extend in a plane which is perpendicular to the spin axis of the gyro rotor. The primary coil 4N is normally energized by an alternating current (AC) power source PS of the gyrocompass so as to create an alternating magnetic field as indicated by broken line arrows a1.

Under a situation when the primary coil 4N is positioned at the center of the segment array consisting of the four rectangular coil segments 5NW, 5NE, 5NU and 5NL of the secondary coil 5N, the magnetic flux from the primary coil 4N penetrates equally among the four rectangular coil segments 5NW, 5NE, 5NU and 5NL, so that the same voltage is induced in each of the four rectangular coil segments. Consequently, no output voltage is produced across the output terminals 2-1 of the differential pair of the rectangular coil segments 5NW and 5NE nor across the output terminals 3-1 of the differential pair of the rectangular coil segments 5NU and 5NL.

Under a situation when the secondary coil 5N is displaced relative to the primary coil 4N horizontally to the west (as shown by arrow W in FIG. 2), more of the magnetic flux from the primary coil 4N penetrates the east-side rectangular coil segment 5NE so that a higher voltage is induced in this coil segment 5NE, while less of the magnetic flux from the primary coil 4N penetrates the west-side rectangular coil segment 5NW so that a lower voltage is induced in this coil segment 5NW. Consequently, any relative displacement in this direction causes a corresponding differential voltage to be produced across the output terminals 2-1 of the differential pair of the rectangular coil segments 5NW and 5NE, while it causes no output voltage to be produced across the output terminals 3-1 of the differential pair of the upper and lower rectangular coil segments 5NU and 5NL.

Under a situation when the secondary coil 5N is displaced relative to the primary coil 4N horizontally to the east (as shown by arrow E in FIG. 2), a similar result occurs but in the opposite direction to the above. That is, more of the magnetic flux from the primary coil 4N penetrates the west-side rectangular coil segment 5NW so that a higher voltage is induced in this coil segment 5NW, while less of the magnetic flux from the primary coil 4N penetrates the east-side rectangular coil segment 5NE so that a lower voltage is induced in this coil segment 5NE. Consequently, any relative displacement in this direction causes a corresponding differential voltage to be produced across the output terminals 2-1 of the differential pair of the rectangular coil segments 5NW and 5NE (the differential voltage has a polarity which is opposite to that of the differential voltage produced when the secondary coil 5N is displaced to the west relative to the primary coil 4N), while it causes no output voltage across the output terminals 3-1 of the differential pair of the upper and lower rectangular coil segments 5NU and 5NL.

Under a situation when the secondary coil 5N is displaced relative to the primary coil 4N in the vertical direction (i.e., upward/downward direction which is perpendicular to four arrows E, W, N and S in FIG. 2), either less or more of the magnetic flux from the primary coil 4N penetrates the upper rectangular coil segment 5NU, while either more or less of the magnetic flux from the primary coil 4N penetrates the lower rectangular coil segment 5NL, respectively. Thus, either a lower or higher voltage is induced in the upper rectangular coil segment 5NU, while either a higher or lower voltage is induced in the lower rectangular coil segment 5NL, respectively. Consequently, any relative displacement in the vertical direction causes a corresponding differential voltage to be produced across the output terminals 3-1 of the differential pair of the upper and lower rectangular coil segments 5NU and 5NL.

Therefore, when the north-side end of the tank 2, onto which the primary coil 4N of the north-side displacement detector unit 6A is attached, is displaced relative to the gyro case 1 in the east-west direction and/or in the vertical direction, then corresponding differential voltages are produced across the output terminals 2-1 of the differential pair of the rectangular coil segments 5NW and 5NE of the secondary coil 5N and/or across the output terminals 3-1 of the differential pair of the rectangular coil elements 5NU and 5NL of the secondary coil 5N. The polarity and the magnitude of the differential voltages are indicative of the direction and the magnitude of the displacement of the north-side end of the tank 2. Under this situation, in the other, south-side displacement detector unit 4S, corresponding differential voltages are produced across the output terminals of the differential pair of the rectangular coil segments 5SW and 5SE of the secondary coil 5S and/or across the output terminals of the differential pair of the rectangular coil elements 5SU and 5SL of the secondary coil 5S, as with the secondary coil 5N of the north-side displacement detector unit 4N. Normally, the differential voltages produced in the south-side displacement detector unit 4S have the opposite polarity to the corresponding differential voltages produced in the north-side displacement detector unit 4S.

(Structure of Azimuth Follow-Up System)

Figure 3:
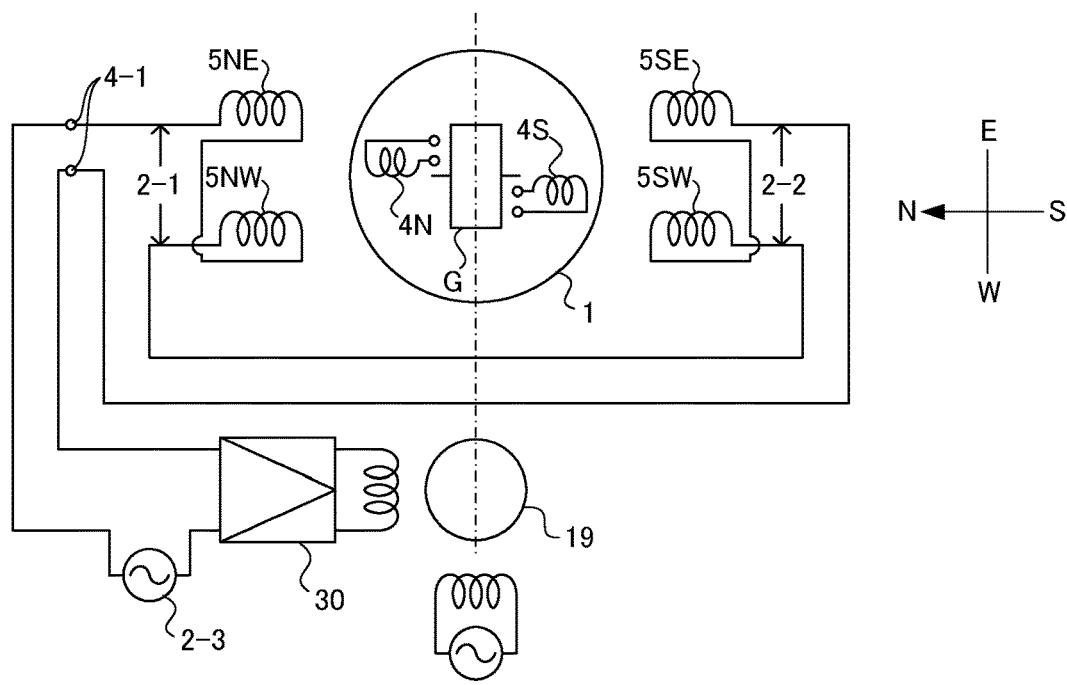
FIG. 3 is a schematic diagram showing a structure of an azimuth follow-up system.

Next described is an azimuth follow-up system. FIG. 3 is a schematic diagram showing a structure of the azimuth follow-up system.

Referring to FIG. 3, when the tank 2 is rotationally displaced relative to gyro case 1 with respect to the rotation about the vertical axis, then differential voltages are produced across the output terminals 2-1 of the differential pair of the rectangular coil segments 5NW and 5NE and also across the output terminals 2-2 of the differential pair of the rectangular coil segments 5SW and 5SE, resulting in that a voltage signal is produced across azimuth signal output terminals 4-1, which are the output terminals for the group of four rectangular coil segments 5NW, 5NE, 5SW and 5SE. The voltage signal produced across the azimuth signal output terminals 4-1 is inputted into an azimuth error detector 40 (shown in FIG. 8 and described later in more detail). The azimuth error detector 40 uses the inputted voltage signal so as to process an azimuth error, which is an error angle of the tank 2 relative to the gyro case 1 with respect to the rotation about the azimuth axis. The azimuth error 40 then outputs an azimuth follow-up signal, which is a signal to be used to make azimuth error zero. The azimuth follow-up signal from the azimuth error detector 40 is amplified by an azimuth servo amplifier 30 and inputted into the azimuth servo motor 19, which works as a torquer. The torque of the azimuth servo motor 19 is transferred through the azimuth pinion 20, the azimuth gear 21, the vertical ring 16, the horizontal ring 12, and finally to the tank 2. The tank 2 is thereby rotated about the vertical axis, such that the relative rotational displacement between the tank 2 and the gyro case 1 with respect to the rotation about the vertical axis is made zero.

In this way, the azimuth orientation of the tank 2 is continuously controlled to follow-up the azimuth orientation of the spin axis of the gyro rotor G, and thus the "N letter" indicated on the compass card 22 is caused to continuously follow-up the azimuth orientation of the spin axis of the gyro rotor G, resulting in that the heading of the ship is readable from the angular error between the "N letter" on the compass card 22 and the lubber line 26.

(Structure of Horizontal Follow-Up System)

Figure 4:
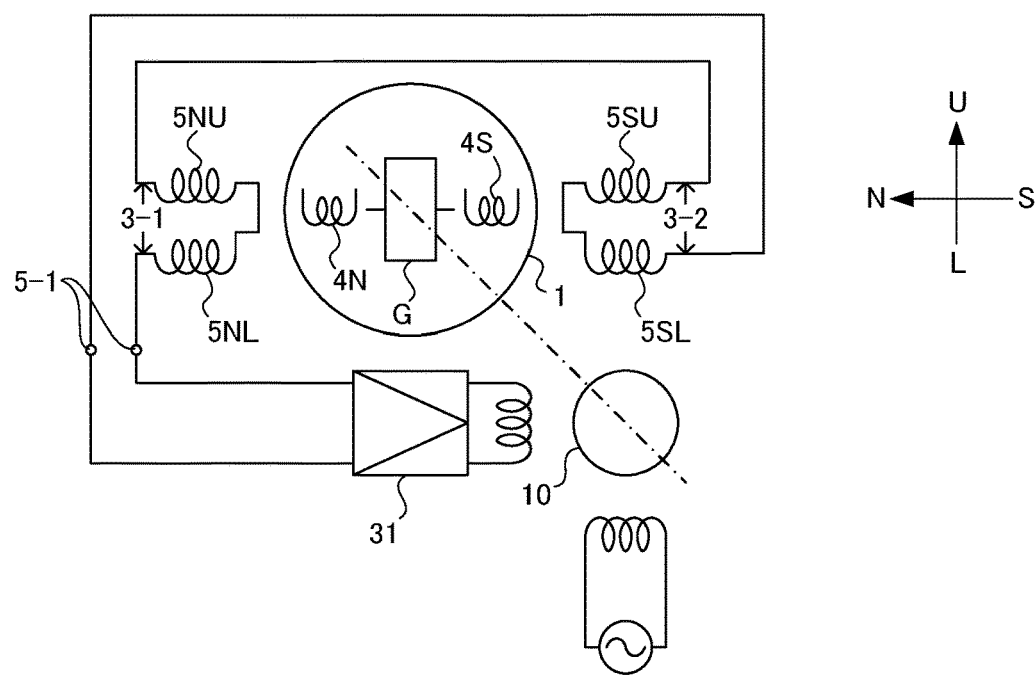
FIG. 4 is a schematic diagram showing a structure of a horizontal follow-up system.

Next described is a horizontal follow-up system. FIG. 4 is a schematic diagram showing a structure of the horizontal follow-up system.

When the tank 2 is rotationally displaced with relative to the gyro case 1 with respect to the rotation about the horizontal axis, then a voltage signal is produced across horizontal signal output terminals 5-1, which are the output terminals for the group of four rectangular coil segments 5NU, 5NL, 5SU and 5SL. The voltage signal produced across the horizontal signal output terminals 5-1 is inputted into a horizontal error detector 41 (shown in FIG. 8 and described later in more detail). The horizontal error detector 41 uses the inputted voltage signal to process a horizontal error, which is an error angle of the tank 2 relative to the gyro case 1 with respect to the rotation about the horizontal axis. The horizontal error detector 41 then outputs a horizontal follow-up signal, which is a signal to be used to make the horizontal error zero. The horizontal follow-up signal from the horizontal error detector 41 is amplified by a horizontal servo amplifier 31 and inputted into the horizontal servo motor 10, which works as a torquer. The torque of the horizontal servo motor 10 is transferred through the horizontal pinion 11, the horizontal gear 9, and finally to the tank 2. The tank 2 is thereby rotated about the horizontal axis, such that the relative rotational displacement between tank 2 and the gyro case 1 with respect to the rotation about the horizontal axis is made zero.

(North-Seeking Function and Damping Action Control System)

Figure 5:
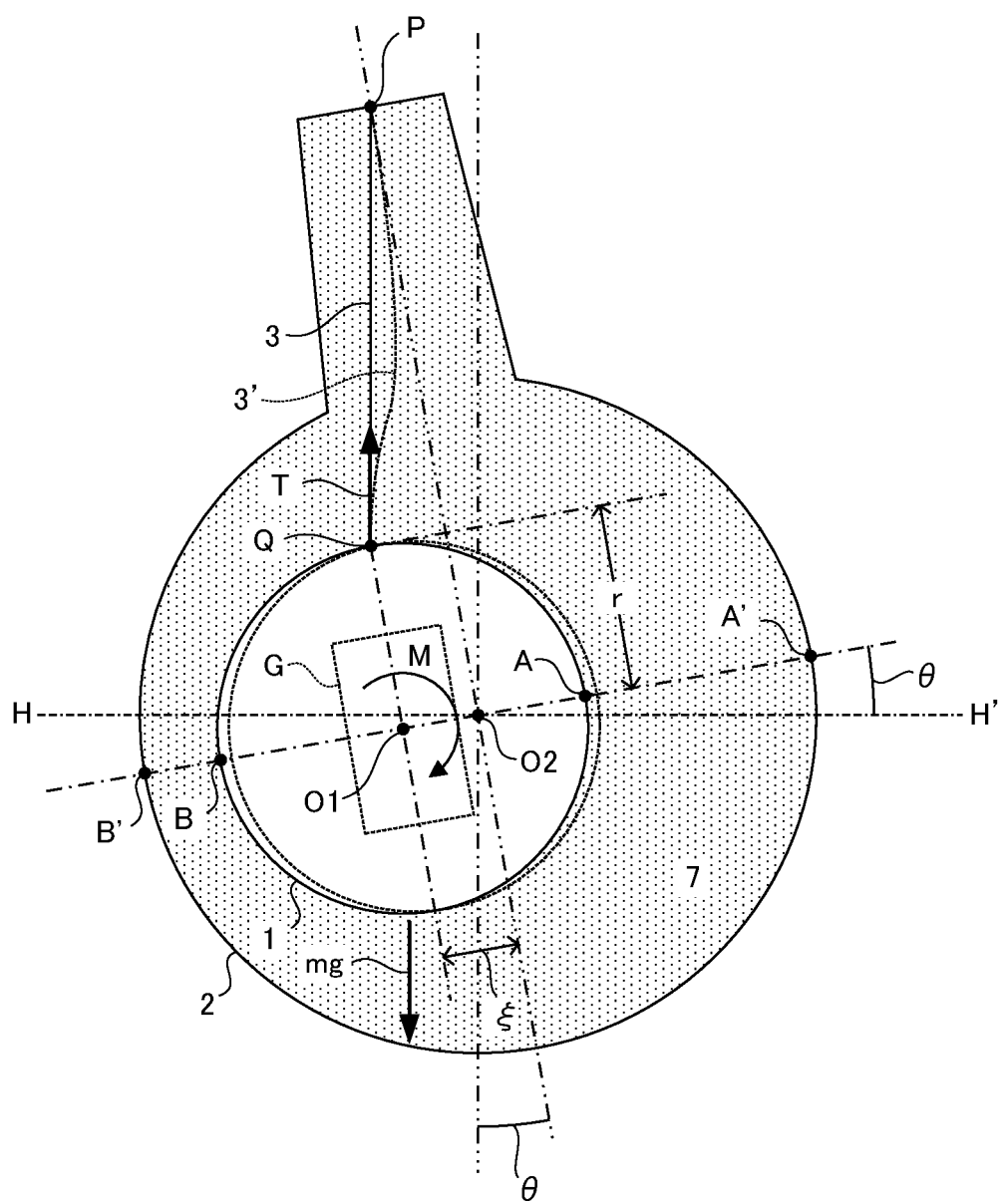
FIG. 5 is a schematic view illustrating the north-seeking function of a gyro rotor.

Next described are a north-seeking function and a damping action control system. FIG. 5 is a schematic view for illustrating the north-seeking function of the gyro rotor. FIG.

Figure 6:
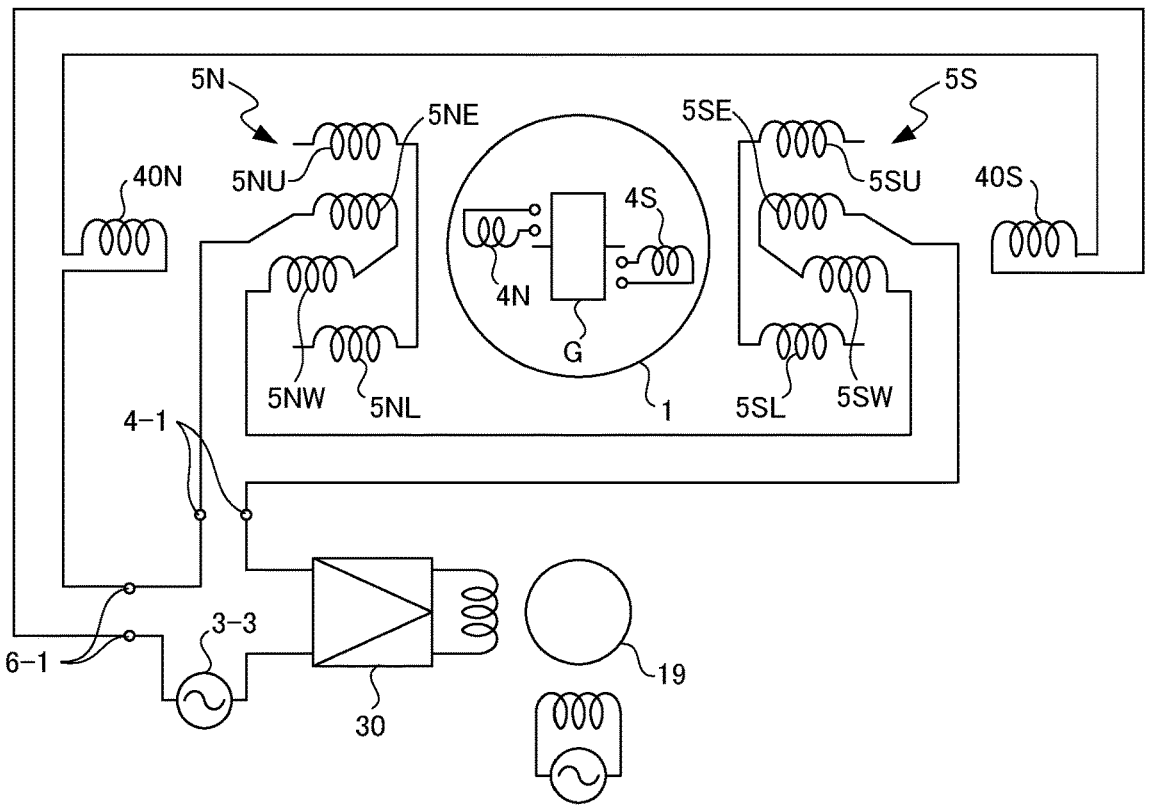
FIG. 6 is a schematic diagram showing a structure of a damping action control system.

6 is a schematic diagram showing a structure of the damping action control system. More specifically, FIG. 5 is a schematic side view of the tank and the gyro case confined in the tank. Further, FIG. 6 schematically shows the pair of displacement detector units attached onto the tank and the gyro case.

The damping action control system of the gyrocompass 901 consists of the damping action control coils 40N and 40S of the displacement detector units 6A and 6B. The damping action control coils 40N and 40S are used to detect their distances from the corresponding primary coils 4N and 4S, respectively, and the detected distances are used to detect a displacement ξ of the gyro case 1 relative to the tank 2. To begin with, the displacement ξ is described in connection with the north-seeking function of the gyro rotor G.

As shown in FIG. 5, the tank 2 is filled up with the highly viscous liquid 7, and the gyro case 1 is suspended through the suspension wire 3 while being immersed in the liquid 7. Here, O1 stands for the gravity center point of the gyro case 1, O2 for the shape center point of the spherical tank 2, P for the connecting point between the upper end of the suspension wire 3 and the tank 2, and Q for the connecting point between the lower end of the suspension wire 3 and the gyro case 1. The tank 2 has its center axis coincident with line P-O2. The spin axis of the gyro rotor G intersects the outer wall surface of the gyro case 1 at points A and B. The spin axis also intersects the inner wall surface of the tank 2 at points A' and B', which correspond to points A and B, respectively. Plane H-H' is the horizontal plane in which the shape center point O2 of the tank 2 lies. The intersection points A and A' are located to the north of the gyro rotor G.

Under a situation when the spin axis of the gyro rotor G is oriented to extend in a horizontal direction (i.e., pitch angle θ=0°), then the north-south line A'-B' of the tank 2 is coincident with the spin axis, and the gravity center point O1 of the gyro case 1 is coincident with the shape center point O2 of the tank 2. Under a different situation, that is, under a situation when (i) the spin axis of the gyro rotor G is oriented to extend inclined relative to the horizontal plane H-H' by a pitch angle θ and (ii) point A, which is located to the north of the gyro rotor G, is in a position above the horizontal plane H-H', then the center axis P-O2 of the tank 2 is oriented to extend inclined relative to the vertical line by the angle equal to the pitch angle θ. Under this situation, the horizontal follow-up system is working to tend to rotate the tank 2 about the horizontal axis such that the inclination of the tank 2 is made to follow-up the pitch angle θ of the gyro rotor G, and the pitch angle θ is reduced during this process.

When the spin axis is inclined relative to the horizontal direction and there are no external forces acting on the gyro case 1, the suspension wire 3 is extending coincident with the vertical line, resulting in that the tension T from the suspension wire 3 acting on the gyro case 1 implies a moment M acting on the gyro case 1, which tends to rotate the gyro case 1 about its gravity center point O1. Where "r" stands for the distance between the gravity center point O1 of the gyro case 1 and the connecting point Q of the gyro case 1 with the suspension wire 3, and "mg" for the weight of the gyro case 1 after compensation for the buoyancy from the liquid 7 in the tank 2, then the moment M is given by equation:

$$M = T \cdot r \sin\theta = mg \cdot r \sin\theta$$

The moment M acts as a torque tending to rotate the gyro rotor G about the horizontal axis, which extends through the gravity center point O1 of the gyro case 1. Thus, the gyro rotor G is subject to the torque having a magnitude which is proportional to the inclination of the spin axis against the horizontal plane and tending to rotate the gyro rotor G about the horizontal axis of the gyrocompass, resulting in that a north-seeking function of the gyrocompass is produced. By proper selection of the distance r, the buoyancy-compensated weight mg and the angular momentum of the gyro rotor G, the period of the north-seeking movement may be suitably adjusted to be, for example, from several tens of minutes to one hundred and several tens of minutes.

The damping action control system of the gyrocompass 901 is so designed as to apply a torque on the gyro case 1, wherein the torque tends to rotate the gyro case 1 about the vertical axis of the gyrocompass 901 and has a magnitude in proportion to the inclination angle of the spin axis against the horizontal plane. When the spin axis of the gyro rotor G is inclined against the horizontal plane, the gravity center point O1 of the gyro case 1 is displaced relative to the shape center point O2 of the tank 2 towards point B' on the tank 2 because the suspension wire 3 tends to extends coincident with the vertical. The displacement, stood for by "ξ", is the distance between points O1 and O2 and is in proportion to the inclination angle of the spin axis of the gyro rotor G against the horizontal plane H-H'. The displacement ξ of the gyro case 1 relative to the tank 2 is detected by means of the damping action control coils 40N and 40S and used to modify the desired rotational position of the tank 2 for enabling the tank 2 to follow-up the gyro case 1. The modification of the desired rotational position of the tank 2 is achieved by twisting the suspension wire 3 as described in the following, which provides a desired damping action control function.

Because the suspension wire 3 has a little resiliency, in reality it tends to deform or bend to assume a curvature as indicated by an exaggerated curved line 3' in FIG. 5 when the gyro case 1 is inclined against the horizontal plane H-H'. Such a deformation of the suspension wire 3 may cause a corresponding, small reduction of the displacement ξ (i.e., the distance between points O1 and O2) in the direction of line A'-B' of the gyro case 1. Nevertheless, because the suspension wire 3 is so flexible and the reduction of the displacement ξ is so small, any such reduction would affect little to the accuracy of the gyrocompass in actual application and therefore will be ignored in the following description.

As shown in FIG. 6, the damping action control system is integrated in the azimuth follow-up system. FIG. 6 shows the elements of the pair of the displacement detector units 6A and 6B, including the primary coils 4N and 4S (which are attached onto the outside surface of the gyro case 1) and the secondary coils 5N and 5S each having the four rectangular coil segments 5NW, 5NE, 5NU, 5NL; 5SW, 5SE, 5SU 5SL (which are attached onto the inside surface of the tank 2). The pair of the displacement detector units 6A and 6B further include the pair of the damping action control coils 40N and 40S for detecting the displacement ξ mentioned above. The damping action control coils 40N and 40S are attached to the north and south of the secondary coils 5N and 5S, respectively.

The damping action control coil 40N has windings extending parallel to the windings of the rectangular coil segments 5NW and 5NE of the secondary coil 5N, which are located side-by-side in the horizontal direction, while the damping action control coil 40S has windings extending parallel to the windings of the rectangular coil segments 5SW and 5SE of the secondary coil 5S, which are located side-by-side in the horizontal direction. The damping action control coils 40N and 40S are differentially connected and have damping action control signal output terminals 6-1 for outputting a differential voltage of the coils 40N and 40S, which is in proportion to the displacement ξ of the gyro case 1 relative to the tank 2.

The damping action control signal output terminals 6-1 are connected to the azimuth signal output terminals 4-1, such that the voltage of the damping action control signal is added to the voltage of the azimuth signal, and the resultant voltage is amplified by the azimuth servo amplifier 30 and fed to the control winding of the azimuth servo motor 19. With this arrangement, the voltage signal fed to the control winding of the azimuth servo motor 19 includes the voltage signal from the damping action control signal output terminals 6-1, so that the azimuth follow-up movement of the tank 2 relative to the gyro case 1 includes additional component which is added on the basis of the displacement ξ.

The rotational position of the tank 2 with respect to the rotation about the vertical axis is displaced from a position that could be provided by the azimuthal follow-up system if the damping action control system were not provided, and this additional rotational displacement of the tank 2 leads to a corresponding twisting stress in the suspension wire 3. As the result, the suspension wire 3 exerts a twisting torque on the gyro case 1, in which the torque has a magnitude in proportion to the displacement ξ of the gyro case 1 relative to the tank 2. By virtue of this, the damping action control function of the gyro rotor G is provided.

(Structure of Rotary Transformer)

Figure 7:
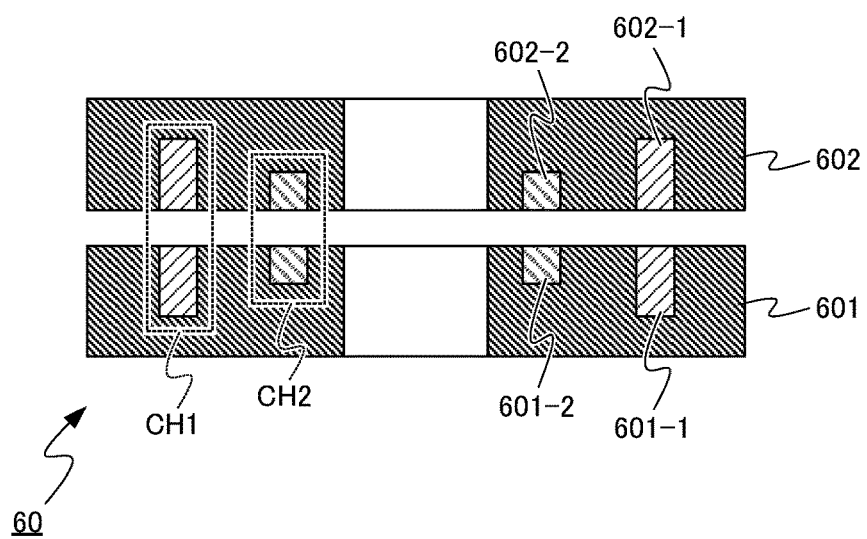
FIG. 7 is a longitudinal sectional view of a rotary transformer used in the gyrocompass according to the first embodiment of the present invention, for illustrating its structure.

Next described is a structure of a rotary transformer used in the gyrocompass according to the first embodiment of the present invention. FIG. 7 is a longitudinal sectional view of the rotary transformer, for illustrating its structure.

The gyrocompass 901 has a stationary part and a rotary part. The stationary part includes the binnacle 24. The rotary part includes the gyro case 1, the tank 2, the horizontal ring 12 and the vertical ring 16. In order to transfer electric power and communication signals between the two parts, the gyrocompass 901 has a rotary transformer 60. As shown in FIG. 7, the rotary transformer 60 has a stator 601 and a rotor 602, which have similar shapes, that is, a ring-like shape with a central through bore. The rotor 602 is supported by the stator 601 for rotation relative to the stator 601, with the bottom surface of the rotor 602 facing the top surface of the stator 601.

The stator 601 has two coaxial ring grooves of different diameters formed in the top surface thereof, in which a first fixed coil 601-1 and a second fixed coil 601-2, each formed as a ring coil, are received, respectively. The first fixed coil 601-1 has a larger diameter than the second fixed coil 601-2, so that the former extends radially outside of the latter.

The rotor 602 has two coaxial ring grooves of different diameters formed in the bottom surface thereof, in which a first rotatable coil 602-1 and a second rotatable coil 602-2, each formed as a ring coil, are received, respectively. The first rotatable coil 602-1 has a larger diameter than the second rotatable coil 602-2, so that the former extends radially outside of the latter.

The first fixed coil 601-1 and the first rotatable coil 602-1 together form a first contactless transfer channel CH1, while the second fixed coil 601-2 and the second rotatable coil 602-2 together form a second contactless transfer channel CH2. The first transfer channel CH1 is used for transferring electric power, while the second transfer channel CH2 is used for transferring serial communication signals, as described later in more detail.

With this structure, the serial communication through the second transfer channel CH2 is subject to little interference from the voltage noises which may be induced in the second fixed coil 601-2 and the second rotatable coil 602-2 by the alternating current of the electric power transferred through the first transfer channel CH1. By selecting the frequencies of the serial communication and the alternating current of the electric power such that the frequency of the former is 2 to 100 times higher than that of the latter, any possible interference between the first transfer channel CH1 and the second transfer channel CH2 may be further reduced.

(Structure of Gyrocompass Control System)

Figure 8:
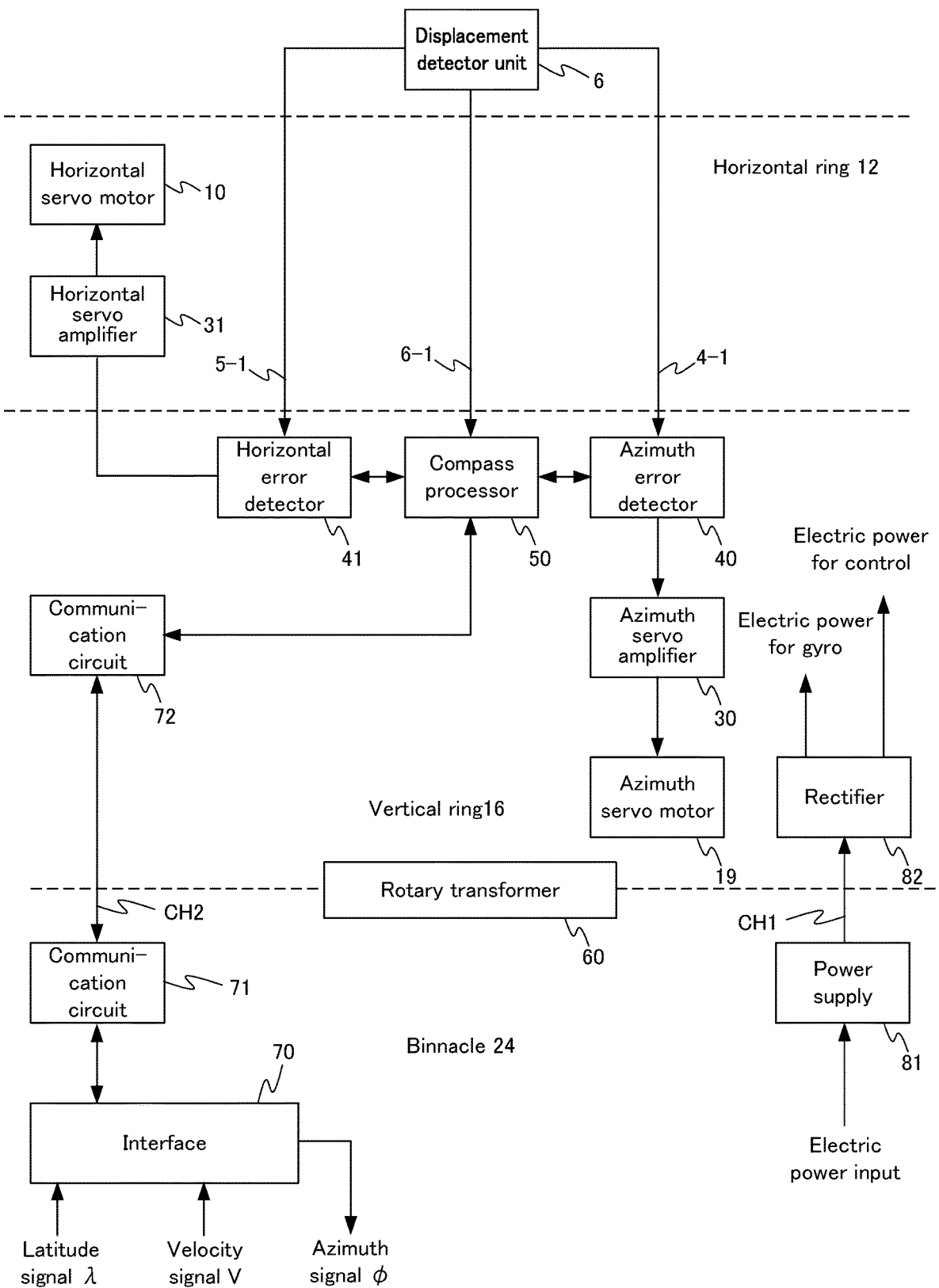
FIG. 8 is a block diagram illustrating mounting locations of elements of a gyrocompass control system used in the gyrocompass according to the first embodiment of the present invention.

Next described is a structure of a gyrocompass control system used in the gyrocompass according to the first embodiment of the present invention. FIG. 8 is a block diagram illustrating mounting locations of elements of the gyrocompass control system.

As shown in FIG. 8, the gyrocompass has an interface 70, a communication circuit 71 and a power supply 81, all of which are mounted on the binnacle 24. The gyrocompass has the azimuth servo motor 19, the azimuth servo amplifier 30, the azimuth error detector 40, the horizontal error detector 41, the compass processor 50, a communication circuit 72 and a rectifier 82, all of which are mounted on the vertical ring 16. Further, the gyrocompass has the horizontal servo motor 10 and the horizontal servo amplifier 31, both of which are mounted on the horizontal ring 12. Among the elements of the gyrocompass, the gyrocompass control system includes the azimuth error detector 40, the horizontal error detector 41 and the compass processor 50.

The interface 70 is the element for inputting/outputting signals into/from the gyrocompass 901. Signals to be inputted into the gyrocompass 901 include latitude signal λ indicating the latitude of the current position of the ship on which the gyrocompass 901 is mounted and velocity signal V indicating the current velocity of the ship. Signals to be outputted from the gyrocompass 901 include azimuth signal φ indicating the heading azimuth of the ship. The communication circuit 71 provides serial communication with the communication circuit 72 mounted on the vertical ring 16, by means of the second transfer channel CH2 of the rotary transformer 60. The power supply 81 supplies alternating current (AC) electric power to the rectifier 82 mounted on the vertical ring 16, by means of the first transfer channel CH1 of the rotary transformer 60.

The communication circuit 72 provides serial communication with the communication circuit 71 mounted on the binnacle 24. The compass processor 50 determines by processing the azimuth signal φ on the basis of (i) the azimuth error signal derived by and obtained from the azimuth error detector 40 and (ii) the latitude signal λ and the velocity signal V both obtained through serial communication provided by the communication circuits 71 and 72. The azimuth signal φ thus determined by the compass processor 50 are outputted from the interface 70 to the outside of the gyrocompass 901 through serial communication.

The rectifier 82 creates (i) a first direct current (DC) electric power for a gyro, which is supplied to the horizontal servo motor 10, the horizontal servo amplifier 31, the azimuth servo motor 19 and the azimuth servo amplifier 30 and (ii) a second direct current (DC) electric power for control, which is supplied to the azimuth error detector 40, the horizontal error detector 41 and the compass processor 50. Different levels of AC voltages are required for Creating different levels of DC voltages, for which the gyrocompass 901 may need to have a transformer. Such a transformer, however, could be omitted from the gyrocompass 901 if the rotary transformer 60 is formed to have ability to create different levels of AC voltages and to supply them to the rectifier 82.

There have been conventional gyrocompasses having an azimuth servo motor and an azimuth servo amplifier both mounted on a binnacle, and using a rotary connector for providing transfer channels for transferring azimuth follow-up signal from an azimuth error detector to the azimuth servo amplifier through serial communication. With this structure, the azimuth follow-up signal is transferred through relatively unstable transfer channels provided by the rotary connector, which may often lead to non-negligible follow-up errors occurring in the azimuth follow-up system, and finally to a poor azimuth precision of the gyrocompass.

In contrast, with the gyrocompass 901 of this embodiment, both of the azimuth servo motor 19 and the azimuth servo amplifier 30 are mounted on the vertical ring 16, so that the azimuth follow-up signal is transferred without being routed through any transfer channel provided by the rotary transformer 60, which leads to an improved azimuth precision of the gyrocompass.

Further, with the gyrocompass 901 of this embodiment, two similar servo motors may be used as the horizontal servo motor 10 and the azimuth servo motor 19, and a common power supply and a common drive circuit may be used for the two servo motors. This facilitates to make the power supply and the driver circuit have a compact structure, a high efficiency and little heat generation. Further, the high efficiency of the power supply and the driver circuit may facilitate identification of the cause and origin of any power supply noises, which may affect the operation of the gyrocompass 901.

Second Embodiment

Figure 9:
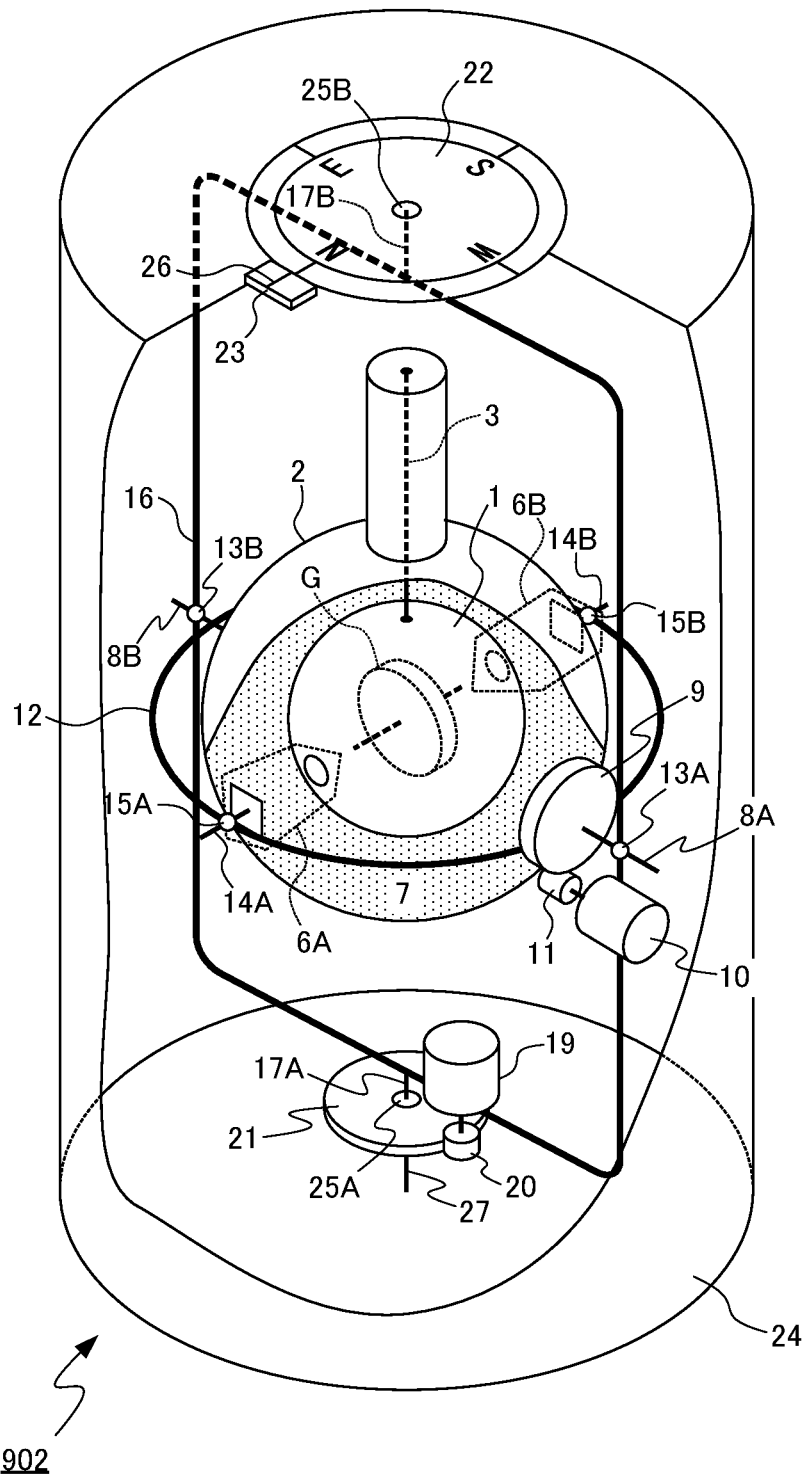
FIG. 9 is a schematic perspective view of a gyrocompass according to a second embodiment of the present invention.
Figure 10:
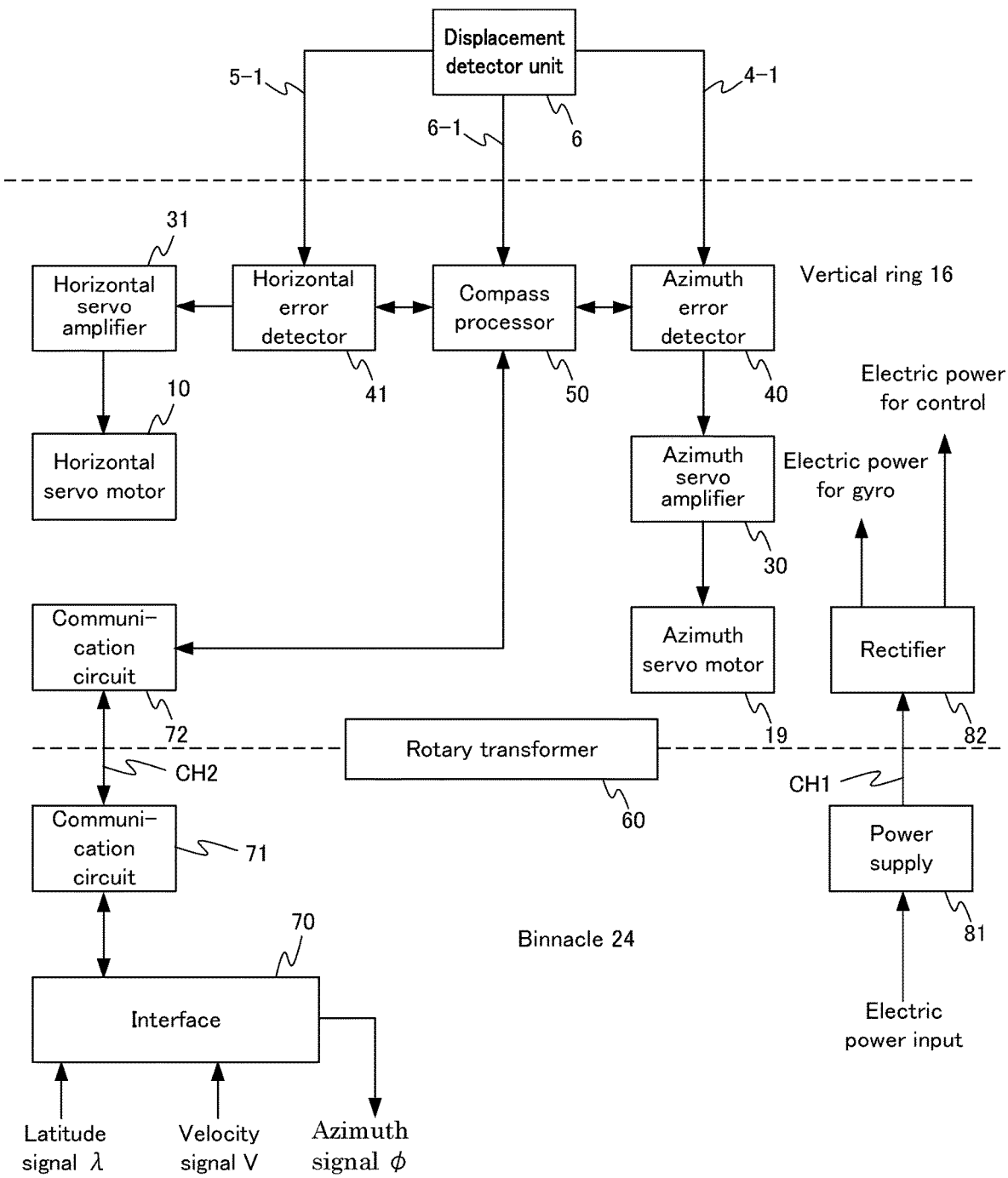
FIG. 10 is a block diagram illustrating mounting locations of elements of a gyrocompass control system used in the gyrocompass according to the second embodiment of the present invention.

Next described is a gyrocompass according to a second embodiment of the present invention. FIG. 9 is a schematic perspective view of the gyrocompass of this embodiment. FIG. 10 is a block diagram illustrating mounting locations of the elements of the gyrocompass control system used in the gyrocompass of this embodiment.

As shown in FIGS. 9 and 10, the gyrocompass 902 according to the second embodiment differs from the gyrocompass 901 according to the first embodiment in that the horizontal servo motor 10 and the horizontal servo amplifier 31 are both mounted onto the vertical ring 16. Further, the elements onto which the horizontal shafts 8A and 8B and the gimbal shafts 14A and 14B are mounted in the gyrocompass 902 according to the second embodiment are different from those in the gyrocompass 901 according to the first embodiment. This is the result of the different mounting locations of the horizontal servo motor 10 and the horizontal servo amplifier 31 between the two embodiments.

The gyrocompass 902 has the pair of gimbal shafts 14A and 14B fixedly connected onto the tank 2 at two respective opposite locations on the outside surface of the tank 2, which are separated from each other in the direction of the spin axis of the gyro rotor G. The gyrocompass 902 has the pair of gimbal shaft bearings 15A and 15B for supporting the gimbal shafts 14A and 14B for rotation, which are mounted onto the horizontal ring 12 at two respective opposite locations on the horizontal ring 12, which are separated from each other in the direction of the spin axis of the gyro rotor G.

The gyrocompass 902 has the pair of horizontal shafts 8A and 8B fixedly connected onto the horizontal ring 12 at two respective opposite locations on the horizontal ring 12, which are separated from each other in the direction of the horizontal axis, which is defined by the horizontal shafts 8A and 8B and intersects perpendicular to the gimbal axis. The gyrocompass 902 has the pair of horizontal shaft bearings 13A and 13B mounted onto the vertical ring 16 at two respective opposite locations on the vertical ring 16, which are separated from each other in the direction of the horizontal axis defined by the horizontal shafts 8A and 8B.

With the gyrocompass 902 according to the second embodiment, the azimuth servo motor 19, the azimuth servo amplifier 30, the horizontal servo motor 10 and the horizontal servo amplifier 31 are mounted onto the vertical ring 16. As the result, a common substrate may be used for both of the azimuth follow-up system and the horizontal follow-up system. This facilitates to make the gyrocompass 902 more compact and efficient. It may also facilitate to achieve reduction in number of parts and wirings required for the gyrocompass 902, leading to a lower manufacturing cost of the gyrocompass 902.

Third Embodiment

Figure 11:
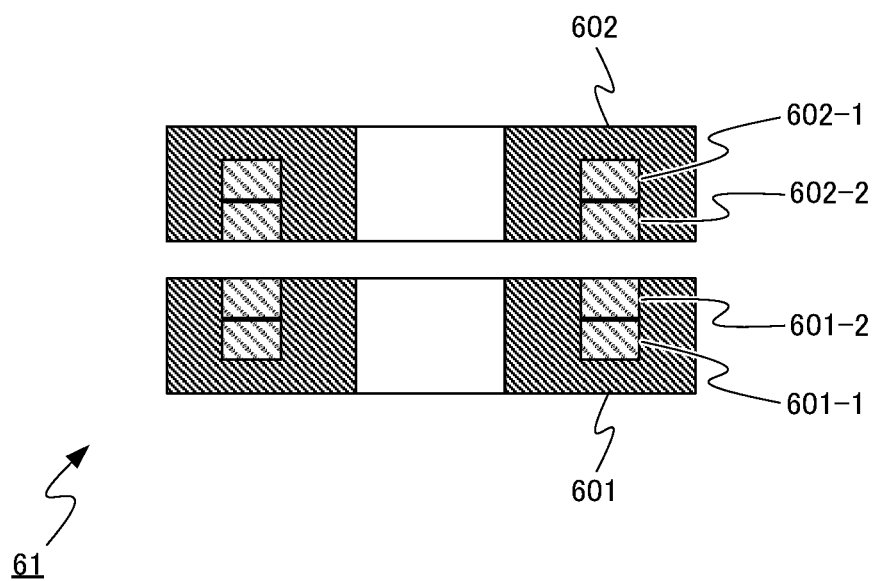
FIG. 11 is a longitudinal sectional view of a rotary transformer used in a gyrocompass according to a third embodiment of the present invention, for illustrating its structure.

Next described is a gyrocompass according to a third embodiment of the present invention. FIG. 11 is a longitudinal sectional view of a rotary transformer used in the gyrocompass of this embodiment, for illustrating its structure.

The gyrocompass according to the third embodiment is a modification of the gyrocompass 902 according to the second embodiment and differs from the latter in that a different rotary transformer 61 is used in place of the rotary transformer 60 described above. As shown in FIG. 11, the rotary transformer 61 differs from the rotary transformer 60 in that it includes a stator 601 and a rotor 602 each having only one ring groove.

The stator 601 has a first fixed coil 601-1 and a second fixed coil 601-2, each formed as a ring coil, having the same diameter, and received in the ring groove of the stator 601 and mounted one on the other. The second fixed coil 601-2 is located nearer to the rotor 602 than the first fixed coil 601-1.

The rotor 602 has a first rotatable coil 602-1 and a second rotatable coil 602-2, each formed as a ring coil, having the same diameter, and received in the ring groove of the rotor 602 and mounted one on the other. The second rotatable coil 602-2 is located nearer to the stator 601 than the first rotatable coil 602-1.

As with the rotary transformer 60 described above, the first fixed coil 601-1 and the first rotatable coil 602-1 together form a first contactless transfer channel CH1, while the second fixed coil 601-2 and the second rotatable coil 602-2 together form a second contactless transfer channel CH2.

The rotary transformer 61 may have a smaller diameter than the rotary transformer 60 described above, which facilitates to make the gyrocompass according to the third embodiment so compact.

The embodiments of the present invention described above are provided by way of illustration only and not intended to be limiting the scope of the invention. The present invention may be embodied in various other forms, and the embodiments are subject to various deletions, substitutions and/or alterations without departing from the spirit and scope of the invention. Any of such embodiments and their modifications fall within the scope and spirits of the present invention and thus within the claimed inventions and their equivalents.

With the gyrocompasses 901 and 902 according to the first and second embodiments, the rotary transformer 60 is used as a rotary connector; however, a slip ring system may be used in place of the rotary transformer 60 as a rotary connector.

LIST OF REFERENCE NUMERALS

G Gyro rotor
1 Gyro case
2 Tank
10 Horizontal servo motor
   (Horizontal-axis-rotation torquer)
12 Horizontal Ring
16 Vertical Ring
19 Azimuth servo motor
   (Vertical-axis-rotation torquer)
24 Binnacle
27 Base plate
60 Rotary transformer
61 Rotary transformer
901 Gyrocompass
902 Gyrocompass

What is claimed is:

1. A gyrocompass, comprising:
a binnacle adapted to be fixedly mounted on a navigation vehicle;
a gyro case having a gyro rotor contained therein;
a vertical ring mounted on the binnacle for rotation about a vertical axis, the vertical axis extending perpendicular to a gimbal axis and to a horizontal axis, wherein the gimbal axis extends in a direction of a spin axis of the gyro rotor and the horizontal axis extends perpendicular to the gimbal axis and parallel to a horizontal plane;
a horizontal ring which is either (i) supported by the vertical ring for rotation about the gimbal axis and supporting the gyro case for rotation about the horizontal axis or (ii) supported by the vertical ring for rotation about the horizontal axis and supporting the gyro case for rotation about the gimbal axis;
a horizontal-axis-rotation torquer for rotating the gyro case about the horizontal axis; and
a vertical-axis-rotation torquer directly mounted on the vertical ring for rotating the vertical ring about the vertical axis.

2. The gyrocompass according to claim 1, wherein:
the horizontal ring is supported by the vertical ring for rotation about the horizontal axis and supporting the gyro case for rotation about the gimbal axis; and
the horizontal-axis-rotation torquer is directly mounted on the vertical ring.

3. The gyrocompass according to claim 1, further comprising:
a gyrocompass control system for controlling the horizontal-axis-rotation torquer and the vertical-axis-rotation torquer so as to maintain an orientation of the gyro case; and
a rotary connector comprising a stator mounted on a stationary part of the gyrocompass and a rotor mounted on a rotary part of the gyrocompass, wherein the stationary part comprises the binnacle and the rotary part comprises the gyro case, the vertical ring and the horizontal ring;
wherein the rotary connector provides (i) a first transfer channel for supplying electric power to the gyrocompass control system, the horizontal-axis-rotation torquer and the vertical-axis-rotation torquer and (ii) a second transfer channel which is a communication channel between the gyrocompass control system and an outside of the gyrocompass.

4. The gyrocompass according to claim 3, wherein:
the rotary connector comprises a rotary transformer;
the first transfer channel is provided by a first fixed coil mounted on the stator and a first rotatable coil mounted on the rotor; and
the second transfer channel is provided by a second fixed coil mounted on the stator and a second rotatable coil mounted on the rotor.

5. The gyrocompass according to claim 4, wherein:
the stator has a groove formed therein, in which the first fixed coil and the second fixed coil are received and mounted one on the other; and
the rotor has a groove formed therein, in which the first rotatable coil and the second rotatable coil are received and mounted one on the other.

6. The gyrocompass according to claim 2, further comprising:
a gyrocompass control system for controlling the horizontal-axis-rotation torquer and the vertical-axis-rotation torquer so as to maintain an orientation of the gyro case; and
a rotary connector comprising a stator mounted on a stationary part of the gyrocompass and a rotor mounted on a rotary part of the gyrocompass, wherein the stationary part comprises the binnacle and the rotary part comprises the gyro case, the vertical ring and the horizontal ring;
wherein the rotary connector provides (i) a first transfer channel for supplying electric power to the gyrocompass control system, the horizontal-axis-rotation torquer and the vertical-axis-rotation torquer and (ii) a second transfer channel which is a communication channel between the gyrocompass control system and an outside of the gyrocompass.

7. The gyrocompass according to claim 6, wherein:
the rotary connector comprises a rotary transformer;
the first transfer channel is provided by a first fixed coil mounted on the stator and a first rotatable coil mounted on the rotor; and
the second transfer channel is provided by a second fixed coil mounted on the stator and a second rotatable coil mounted on the rotor.

8. The gyrocompass according to claim 7, wherein:
the stator has a groove formed therein, in which the first fixed coil and the second fixed coil are received and mounted one on the other; and
the rotor has a groove formed therein, in which the first rotatable coil and the second rotatable coil are received and mounted one on the other.

\* \* \* \* \*